United States Patent
Gallegos et al.

(10) Patent No.: US 12,474,014 B2
(45) Date of Patent: Nov. 18, 2025

(54) ATTACHMENT BRACKET APPARATUS

(71) Applicant: Unirac Inc., Albuquerque, NM (US)

(72) Inventors: Ernest Gallegos, Albuquerque, NM (US); Neha Avadhoot, Hyderabad (IN)

(73) Assignee: Unirac, Inc., Albuquerque, NM (US)

( * ) Notice: Subject to any disclaimer, the term of this patent is extended or adjusted under 35 U.S.C. 154(b) by 120 days.

(21) Appl. No.: 18/109,734

(22) Filed: Feb. 14, 2023

(65) Prior Publication Data

US 2023/0258295 A1  Aug. 17, 2023

(51) Int. Cl.
*F16M 13/02* (2006.01)

(52) U.S. Cl.
CPC ......... *F16M 13/02* (2013.01); *F16M 2200/08* (2013.01)

(58) Field of Classification Search
CPC .......................... F16M 13/02; F16M 2200/08
USPC ... 248/200, 346, 1, 346.03, 346.5, 21, 205.1
See application file for complete search history.

(56) References Cited

U.S. PATENT DOCUMENTS

| | | |
|---|---|---|
| D31,970 S | 12/1899 | McDonald |
| D157,905 S | 3/1950 | Risk |
| D212,125 S | 8/1968 | Barry |
| D251,684 S | 4/1979 | Wood et al. |
| 5,609,326 A * | 3/1997 | Stearns ............ E04D 13/10 256/65.16 |
| RE35,485 E | 4/1997 | Stewart |
| D408,272 S | 4/1999 | Caron et al. |
| D437,771 S | 2/2001 | Barnes et al. |
| D443,501 S | 6/2001 | Sleppy |
| D449,623 S | 10/2001 | Neuerburg |
| 6,923,611 B2 | 8/2005 | Kenny |
| 7,012,188 B2 | 3/2006 | Erling |
| D536,239 S | 2/2007 | Tallman |
| D559,083 S | 1/2008 | Brassard |
| D640,289 S | 6/2011 | Wilhelm |
| D647,538 S | 10/2011 | Wilhelm |
| 8,733,718 B2 | 5/2014 | Corsi |
| 8,839,575 B1 | 9/2014 | Liu et al. |
| D758,174 S | 6/2016 | Lee et al. |
| 9,484,853 B2 | 11/2016 | Stapleton |
| D782,281 S | 3/2017 | Kuo |

(Continued)

OTHER PUBLICATIONS

"Uxcell Aluminum L Shape Solar Panel Mounting Brackets", Retrieved Jul. 16, 2024, at <<https://www.amazon.com/uxcell-80x40x40mm-Aluminum-Mounting-Brackets/dp/B078HVFGTM>>, 2017, 3 pgs.

(Continued)

*Primary Examiner* — Alfred J Wujciak
(74) *Attorney, Agent, or Firm* — Lee & Hayes, P.C.

(57) ABSTRACT

An attachment bracket apparatus includes a base and a flange extending vertically from the base. A central axis extends along the length of the base. A first hole is disposed along the central axis of the base and in the first side of the base. A second hole is disposed along the central axis of the base and in the second side of the base. One or more third holes are disposed on the first side of the base, and one or more fourth holes are disposed on the second side of the base. At least the one or more third holes, respectively, are positioned offset from the central axis and are further offset from each other, respectively, in a direction that is perpendicular to a direction of extension of the central axis.

13 Claims, 6 Drawing Sheets

(56) References Cited

U.S. PATENT DOCUMENTS

| | | | |
|---|---|---|---|
| 10,097,133 B2 * | 10/2018 | Aliabadi | F24S 25/636 |
| 10,135,387 B2 | 11/2018 | Seery et al. | |
| 10,171,026 B2 | 1/2019 | Meine | |
| D840,282 S | 2/2019 | Coste | |
| D841,436 S | 2/2019 | Ito et al. | |
| D841,438 S | 2/2019 | Ito et al. | |
| D866,300 S * | 11/2019 | Mercier | D8/354 |
| 10,601,360 B2 | 3/2020 | Mayfield et al. | |
| 10,663,195 B2 * | 5/2020 | Ash | H02S 20/23 |
| 10,767,684 B1 | 9/2020 | Meine et al. | |
| 10,840,850 B1 * | 11/2020 | Atia | F24S 25/15 |
| D909,853 S | 2/2021 | Jasmin | |
| 11,070,166 B2 * | 7/2021 | Gideon | H02S 20/30 |
| D934,929 S | 11/2021 | Kremerman | |
| D968,256 S | 11/2022 | Wang et al. | |
| 11,486,134 B2 | 11/2022 | Meine | |
| 11,515,831 B2 | 11/2022 | Affentranger, Jr. et al. | |
| D983,016 S | 4/2023 | Jasmin et al. | |
| 11,725,688 B2 | 8/2023 | Meine et al. | |
| 11,750,143 B1 * | 9/2023 | Jasmin | H02S 20/23 |
| | | | 248/237 |
| 11,808,042 B2 | 11/2023 | Gallegos | |
| 11,913,206 B1 | 2/2024 | Banks | |
| 12,018,476 B2 | 6/2024 | Meine | |
| 12,085,112 B2 | 9/2024 | Meine et al. | |
| 2006/0096192 A1 | 5/2006 | Daudet | |
| 2008/0251650 A1 * | 10/2008 | Borbolla | H02G 3/086 |
| | | | 174/58 |
| 2014/0109496 A1 | 4/2014 | Stapleton | |
| 2015/0060619 A1 | 3/2015 | Krannich et al. | |
| 2016/0111999 A1 | 4/2016 | Stapleton | |
| 2016/0134230 A1 * | 5/2016 | Meine | H02S 20/23 |
| | | | 52/698 |
| 2016/0268958 A1 | 9/2016 | Wildes et al. | |
| 2018/0062571 A1 * | 3/2018 | Ash | H02S 20/23 |
| 2018/0102731 A1 | 4/2018 | Stapleton | |
| 2018/0167023 A1 | 6/2018 | Meine | |
| 2019/0081587 A1 | 3/2019 | Mayfield et al. | |
| 2019/0131916 A1 | 5/2019 | Tomolillo | |
| 2019/0131918 A1 * | 5/2019 | Kobayashi | F16B 2/12 |
| 2019/0363668 A1 | 11/2019 | Stapleton | |
| 2020/0244214 A1 | 7/2020 | Stapleton | |
| 2022/0372762 A1 * | 11/2022 | Gallegos | F24S 25/61 |
| 2023/0087857 A1 * | 3/2023 | Anselmo | F16M 11/2078 |
| | | | 248/200 |
| 2023/0090124 A1 | 3/2023 | Haddock et al. | |
| 2024/0018785 A1 | 1/2024 | Gallegos | |
| 2024/0060598 A1 * | 2/2024 | Wogan | H02S 20/23 |

OTHER PUBLICATIONS

Search Report and Written Opinion for International Application No. PCT/US24/15689, dated May 29, 2024, 12 pages.

MONOTARO.SG. "Monlaro_NPL" 8 . . . [online]. Apr. 18, 2012; [Retrieved on Jul. 20, 2022]. Retrieved from the Internet: <url: --- A https://www.monotaro.sg/g/1000185903.html?experiment_ 1804=1 > p. 1, first picture, last 6-8 sentences of the first paragraph under the picture.

Office Action for U.S. Appl. No. 17/327,569, mailed on Mar. 30, 2023, Gallegos, "Attachment Bracket Apparatus", 24 Pages.

Office Action for U.S. Appl. No. 17/327,569, mailed on Aug. 10, 2022, Gallegos, "Attachment Bracket Apparatus", 19 Pages.

The PCT Search Report and Written Opinion mailed Sep. 9, 2022. for PCT application No. PCT/US22/30217, 8 pages.

Office Action for U.S. Appl. No. 18/374,846, mailed on Oct. 21, 2024, Gallegos, "Attachment Bracket Apparatus", 13 Pages.

Search Report for European Application No. 22805555.4, dated Feb. 25, 2025, 8 pages.

* cited by examiner

ATTACHMENT BRACKET APPARATUS

CROSS REFERENCE TO RELATED PATENT APPLICATIONS

This application claims priority to and is a continuation-in-part of U.S. patent application Ser. No. 17/327,569, filed on May 21, 2021, entitled "Attachment Bracket Apparatus," which is incorporated in its entirety by reference.

BACKGROUND

As the solar energy industry continues to grow, the equipment to mount photovoltaic (PV) modules (AKA "solar panels") on different types of structures and/or locations continues to adapt and improve as well. Though a variety of apparatuses exist to secure the PV modules and/or anchor PV module mounting assemblies, the number of parts and or different arrangements of the parts still leave much to be desired for an efficient and quick assembly to minimize the amount of time a worker may be working on a roof or in a similarly physically demanding or potentially hazardous condition.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to an attachment bracket apparatus, which is referred to herein as "the bracket." Embodiments of the bracket disclosed herein may be used on a roof or other structure and is a simple, secure, and watertight solution that provides a structure to which solar panel mounting equipment may be attached.

The bracket disclosed herein may include through holes in the bracket through which fasteners are inserted to secure the bracket to a first type of structure such as a rafter or other type of beam. The bracket disclosed herein may also include divots, depressions, or dents (referred to herein as "the divots") in a base of the bracket through which fasteners may be optionally drilled to secure to the bracket to a second type of structure such as roof decking or other type of sheathing. The divots provide a guide where fasteners may be easily drilled through the base of the bracket when securing the bracket to the second type of structure. For example, a thickness of the base of the bracket may be thinner at a location of the divots compared to other portions of the base, allowing an installer to easily drill through the base when securing the bracket to a structure. Furthermore, when fasteners are not drilled through the depressions when the bracket is secured to the first type of structure, the divots prevent water, air, particulate matter, or other undesirable substances from getting below the base of the bracket which could cause damage to the bracket, roof, or other structure to which the bracket is mounted.

The bracket disclosed herein may include an integrated sealing system. Embodiments of the bracket disclosed herein may eliminate the use of standard flashing necessitated by known products. Once the bracket is fastened to a roof (or other structure), a sealant may be injected through a port into an enclosed cavity around the fastener(s) and corresponding roof penetration(s). The force from the sealant dispenser gun increases the pressure inside enclosed cavity forcing air out through a vent opposite the port. This method may allow for sealant to completely fill voids and remove air inside the enclosed cavity around the penetration(s).

Advantages of the embodiments of the bracket disclosed herein include but are not limited to: a bracket that is easily securable to various types of structures; creation of a permanent airtight and watertight seal; elimination of standard flashings and assemblies, thereby reducing costs; elimination of the need to cut shingles; and reduction of the overall cost and time to install a system.

Illustrative Embodiments of an Attachment Bracket

Figure 1:
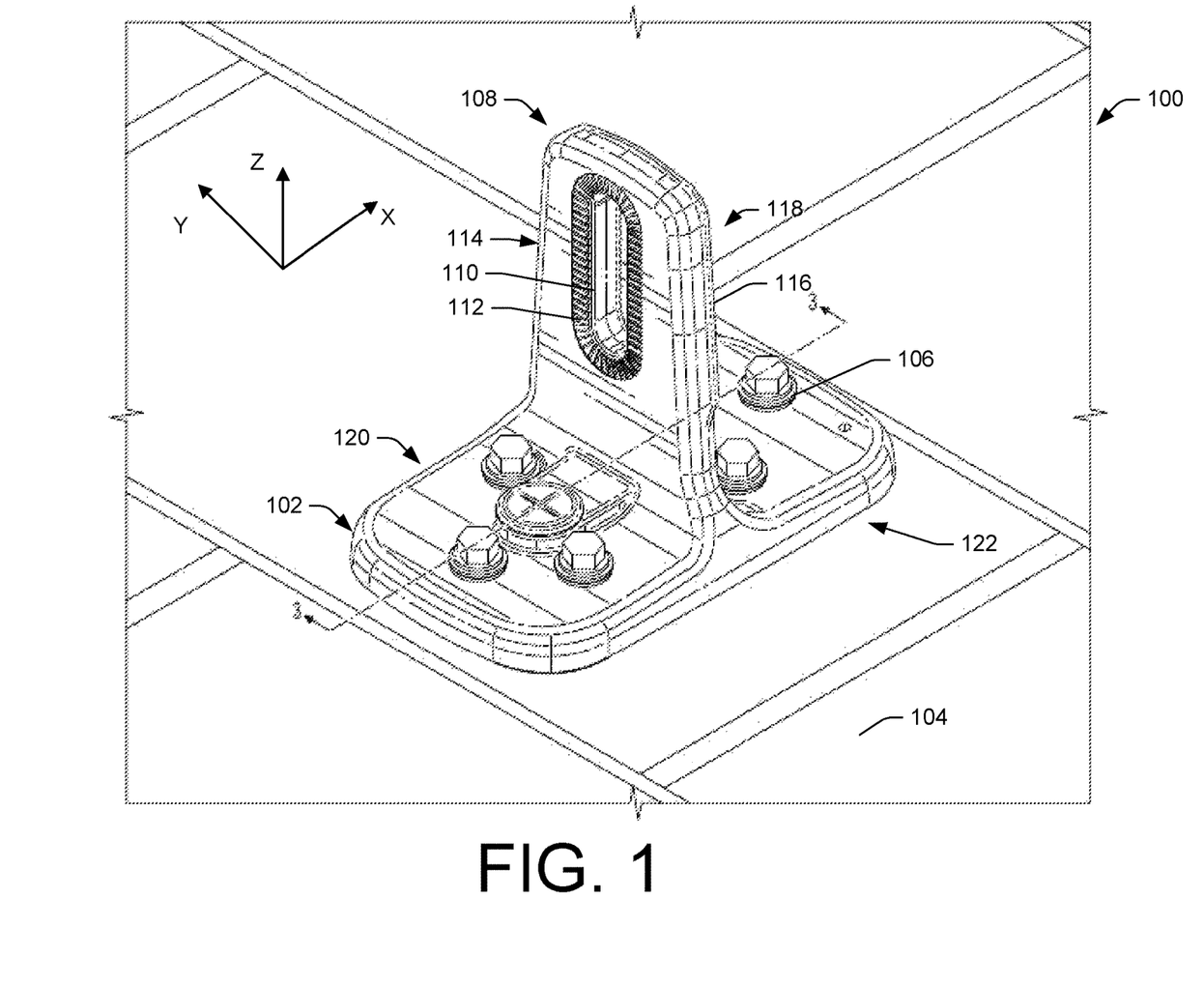
FIG. 1 illustrates a perspective view of an attachment bracket apparatus mounted to a mounting structure, according to an embodiment of this disclosure.

Specifically, FIG. 1 illustrates an attachment bracket apparatus 100 ("bracket"). In an embodiment, the bracket 100 may be configured to support a solar panel mount rail by securing the solar panel mount rail thereto. The bracket 100 includes a base 102 that extends in a first plane (such as a horizontal plane or in the X direction). The base 102 of the bracket 100 is configured to be secured to a mounting structure 104. In an embodiment, the mounting structure 104 may comprise a roof or other structure to which the bracket 100 is coupled or otherwise secured. In an embodiment, various intervening components may be disposed between the bracket 100 and the mounting structure 104. For example, tar paper, shingles, housewrap, roof decking, sheathing, or other components of a roof or other structure may be disposed between the base 102 of the bracket 100 and the mounting structure 104. Despite the various intervening components, the bracket 100 may be secured to the mounting structure via fasteners 106 that are inserted through the base 102 and into the mounting structure, thereby securing the bracket 100 to the mounting structure 104.

The mounting structure 104 may include different types of mounting structures depending on application and/or mounting location. For example, the mounting structure 104 may include a first type of mounting structure such as a rafter, strut, or other type of beam to which the bracket 100 is secured. Furthermore, the mounting structure 104 may include a second type of mounting structure such as roof decking or other type of sheathing to which the bracket 100 is secured. While describing two types of mounting structures, it is to be understood that the bracket 100 may be secured to less than or more than two types of mounting structures. The varying types of mounting structures may include various compositions and mechanical properties. As such, the bracket 100 may be secured to the mounting structure 104 via various configurations of fasteners and components of the bracket 100, as will be described further herein below.

The bracket 100 also includes a flange 108 extending vertically from the base 102 of the bracket 100 in a direction transverse to a direction of extension of the plane of the base 102. In an embodiment, the flange 108 extends in a second plane (such as a vertical plane or in the Z direction) that is substantially perpendicular to the first plane. In an embodiment the flange 108 extends from a top side of the base 102 and is positioned transverse to a length of the base 102, such that the flange 108 bisects the base 102.

The flange 108 includes an aperture 110 extending at least a portion of a length of the flange 108. In an embodiment, one or more fasteners may be inserted through the aperture 110 of the flange 108 in order to secure a secondary structure (such as a solar panel mounting rail) to the flange 108 of the bracket 100. In an embodiment, the flange 108 may include teeth 112 extending from the aperture 110. The teeth 112 may include ratchet teeth and may extend radially from the aperture 110. The teeth 112 may be disposed on a first side 114 of the flange 108 and may be configured to correspond with ratchet teeth on one or more fasteners that are inserted into the aperture 110 in order to secure the secondary structure thereto. The flange 108 may also include corrugations 116 extending from a second side 118 of the flange 108 that is opposite the first side 114. The corrugations 116 may be configured to extend parallel to each other. As mentioned previously, the flange 108 may be positioned to bisect the base 102, thereby forming a first side 120 and a second side 122 of the base 102.

Figure 2:
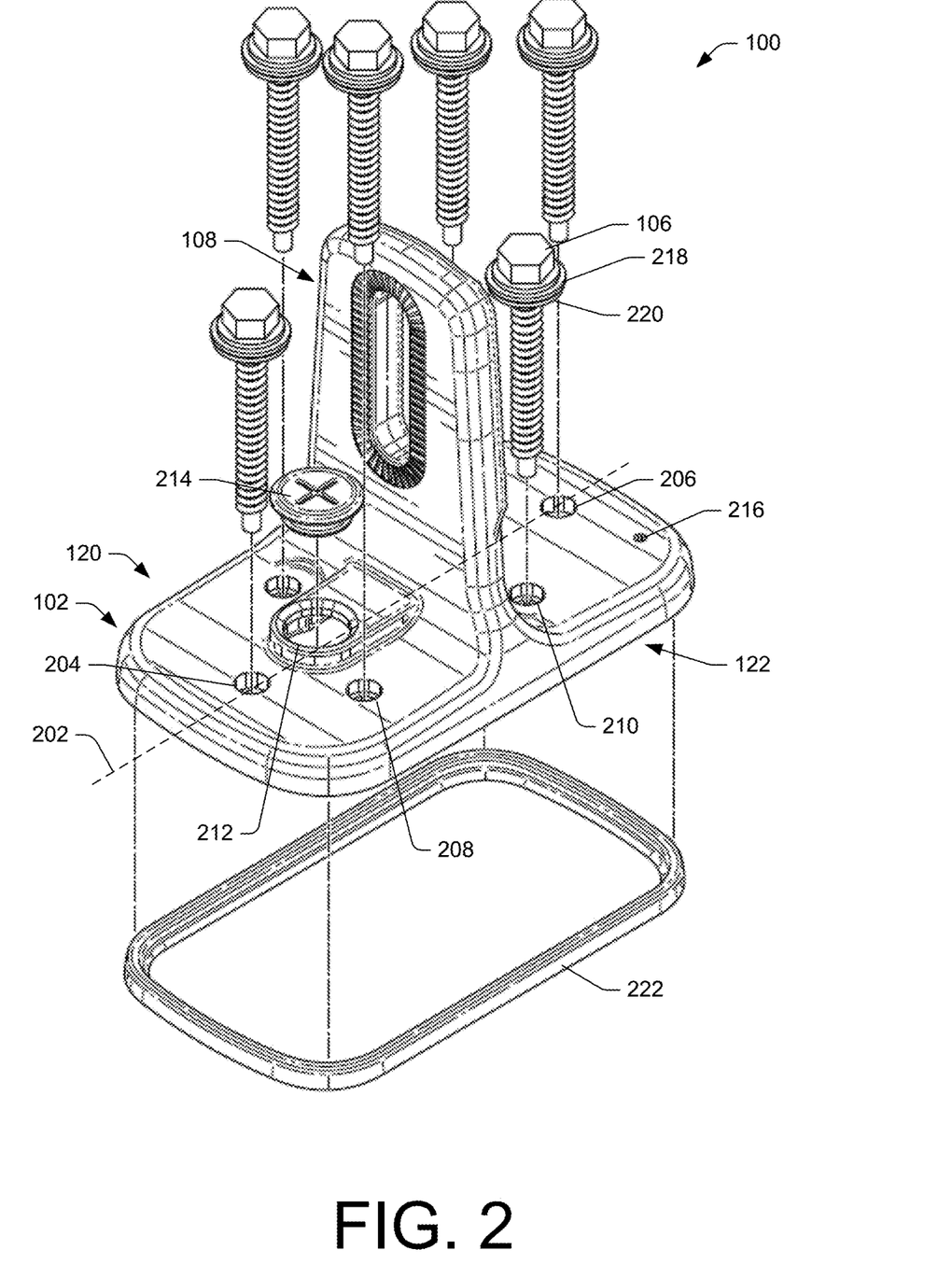
FIG. 2 illustrates an exploded view of various components of the attachment bracket apparatus shown in FIG. 1, according to an embodiment of this disclosure.

FIG. 2 illustrates an exploded view of various components of the bracket 100, as shown and described in FIG. 1. In an embodiment, the base 102 may include a central axis 202 extending along a length of the base 102. In an embodiment, the base 102 includes a first hole 204 disposed along the central axis 202 of the base 102 and in the first side 120 of the base 102. The first hole 202 may be configured to secure a fastener 106 therein. The base 102 may also include a second hole 206 disposed along the central axis 202 of the base 102 and the second side of the base 102. The second hole 206 may be configured to secure a faster therein. In an embodiment, when the bracket 100 is secured to the first type of mounting structure, the bracket 100 may be secured to the mounting structure 104 via fasteners that are inserted through the first hole 204 and the second hole 206. Since rafters and other types of beams are more robust than sheathing or other types of mounting structures, the bracket 100 may be mounted to the first type of mounting structure using fewer fasteners and corresponding holes in the bracket 100 than when the bracket 100 is secured to sheathing. As such, when the bracket 100 is secured to the first type of mounting structure, the bracket 100 may be secured to the mounting structure 104 via fasteners inserted through the first hole 204 and the second hole 206.

In an embodiment, the base 102 further includes one or more first divots 208 disposed on the first side 120 of the base 102 adjacent the central axis 202. The one or more first divots 208 may include semi-circular divots formed in the base 102 and configured to provide a guide for self-drilling fasteners as the self-drilling fasteners are drilled through the one or more first divots 208. Additionally, and/or alternatively, the base 102 may also include one or more second divots 210 disposed on the second side 122 of the base 102 adjacent the central axis 202. The one or more second divots 210 also include semi-circular divots formed in the base 102 and configured to provide a guide for self-drilling fasteners as the self-drilling fasteners are drilled through the one or more first divots 208. In an embodiment, the fasteners are optionally drilled through the one or more first divots 208 and/or the one or more second divots 210 when the bracket 100 is secured to the second type of mounting structure. For example, and as described previously, the second type of mounting structure may include roof decking or other type of sheathing that is less robust than a rafter or other beam. As such, the one or more first divots 208 and the one or more second divots 210 provide a guide where fasteners may be easily drilled through the base 102 of the bracket 100 when securing the bracket to the second type of mounting structure. Furthermore, if some of the one or more first divots 208 and/or the one or more second divots 210 are not drilled when the bracket 100 is secured to the first type of mounting structure or the second type of mounting structure, the one or more first divots 208 and/or the one or more second divots 210 prevent water, air, or other substances from entering into a space between the bracket and the mounting structure 104.

In an embodiment, the bracket 100 further includes an injection port 212 disposed within the first side of the base 102 and in connection with a cavity (shown in FIG. 3) formed by a bottom surface of the base. The injection port 212 may include a plug 214 inserted at least partially within the injection port 212. In an embodiment, the plug 214 is penetrable by a sealant dispenser such that the injection port 212 receives sealant via injection, thereby permitting passage of the sealant into an empty space formed between the cavity of the base and the mounting structure. The plug 214 may comprise a rubber plug having slits formed therein to allow a tip of a sealant dispensing gun to pass therethrough. In an embodiment, the bracket 100 further includes a vent port 216 disposed within the second side 210 of the base 102 and in connection with the cavity. The vent port 216 is configured to allow sealant to displace air within the empty space when sealant is injected into the empty space.

As shown in FIG. 2, the bracket 100 includes fasteners 106 that may include one or more washers disposed between a head of the fasteners 106 and the base 102 of the bracket 100. For example, the fasteners 106 may include a metallic washer 218 disposed proximate the head of the fastener and a rubber washer 220 disposed proximate the base 102 of the bracket 100 and between the base 102 and the metallic washer 218. In an embodiment, the rubber washer 220 seals a hole formed by a fastener by at least partially covering a hole in which the fastener is inserted and by engaging threading along a shaft of the fastener.

The bracket 100 further includes a gasket 222 (or seal) that is configured to be inserted into a groove (shown and described with respect to FIG. 3) in the bracket 100. The gasket 222 may provide an airtight and watertight seal for the base 102 when the base 102 is mounted to the mounting structure 104. The gasket 222 may comprise rubber, fiber, foam, rubber molding compounds, or any other suitable material that provides a secure seal between the base 102 of the bracket 100 and the mounting structure 104.

Figure 3:
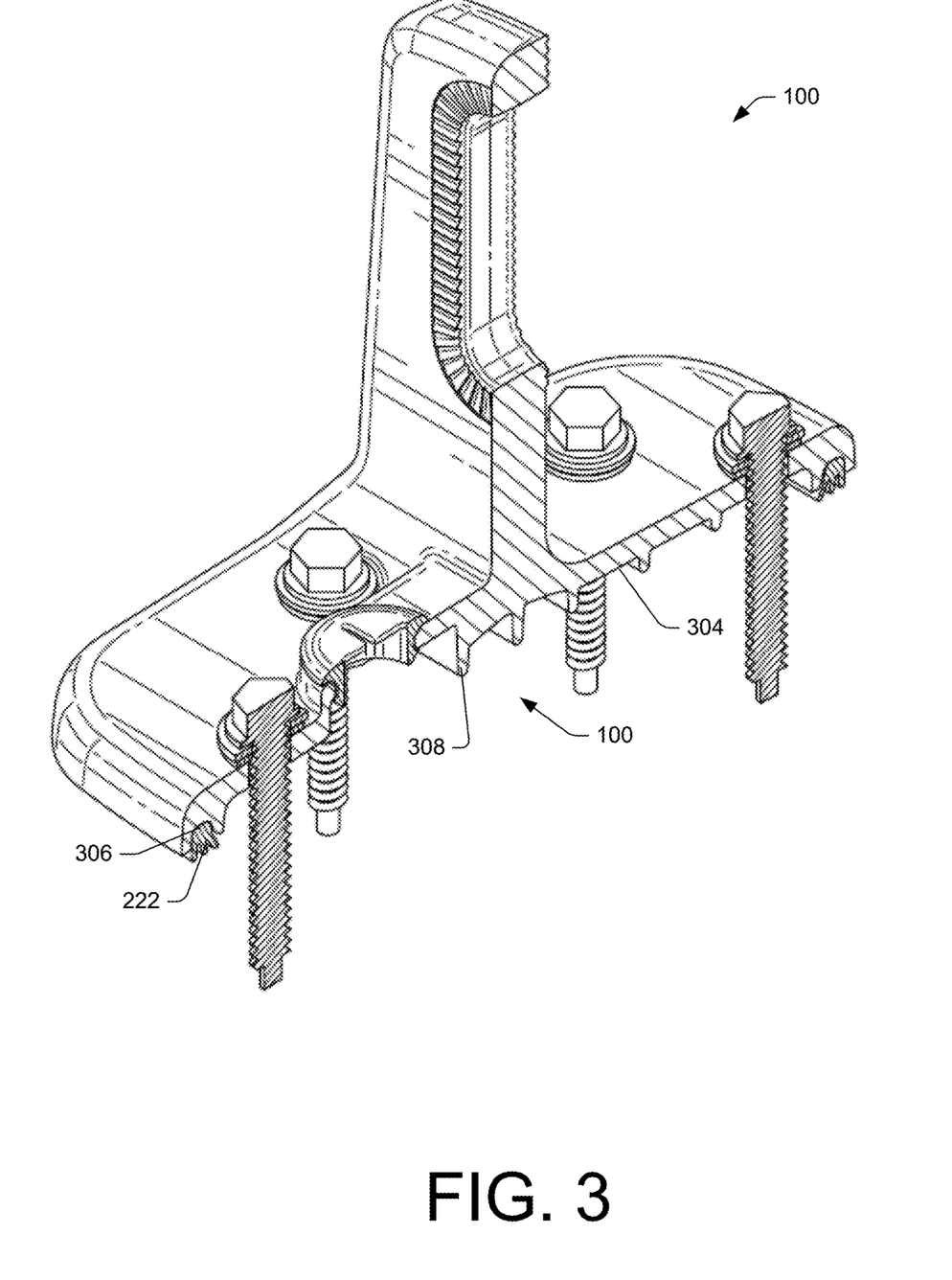
FIG. 3 illustrates a cross-sectional view of the attachment bracket apparatus shown in FIG. 1, according to an embodiment of this disclosure.

FIG. 3 illustrates a cross-sectional view of the bracket 100. As described previously, the bracket 100 includes a cavity 302 formed at least partially by a bottom surface 304 (or bottom side) of the bracket 100. The cavity 302 is configured to enclose an empty space between the cavity and the mounting surface 104. In an embodiment, when sealant is injected into the cavity, the sealant may completely fill the cavity 302. The bracket 100 further includes a groove 306 that circumscribes a bottom portion (or bottom side) of the base 102. As mentioned previously, the bracket 100 includes the gasket 222 that is inserted into the groove 306 such that the gasket 222 fills the groove 306 and at least a portion of the gasket 222 extends from the groove 306.

The base 102 may further include one or more ribs 308 extending from the bottom surface 304 of the base 102. The one or more ribs 308 may strengthen the base 102, while allowing for a reduced amount of material to form the cavity 302 in the base 102.

Figure 4:
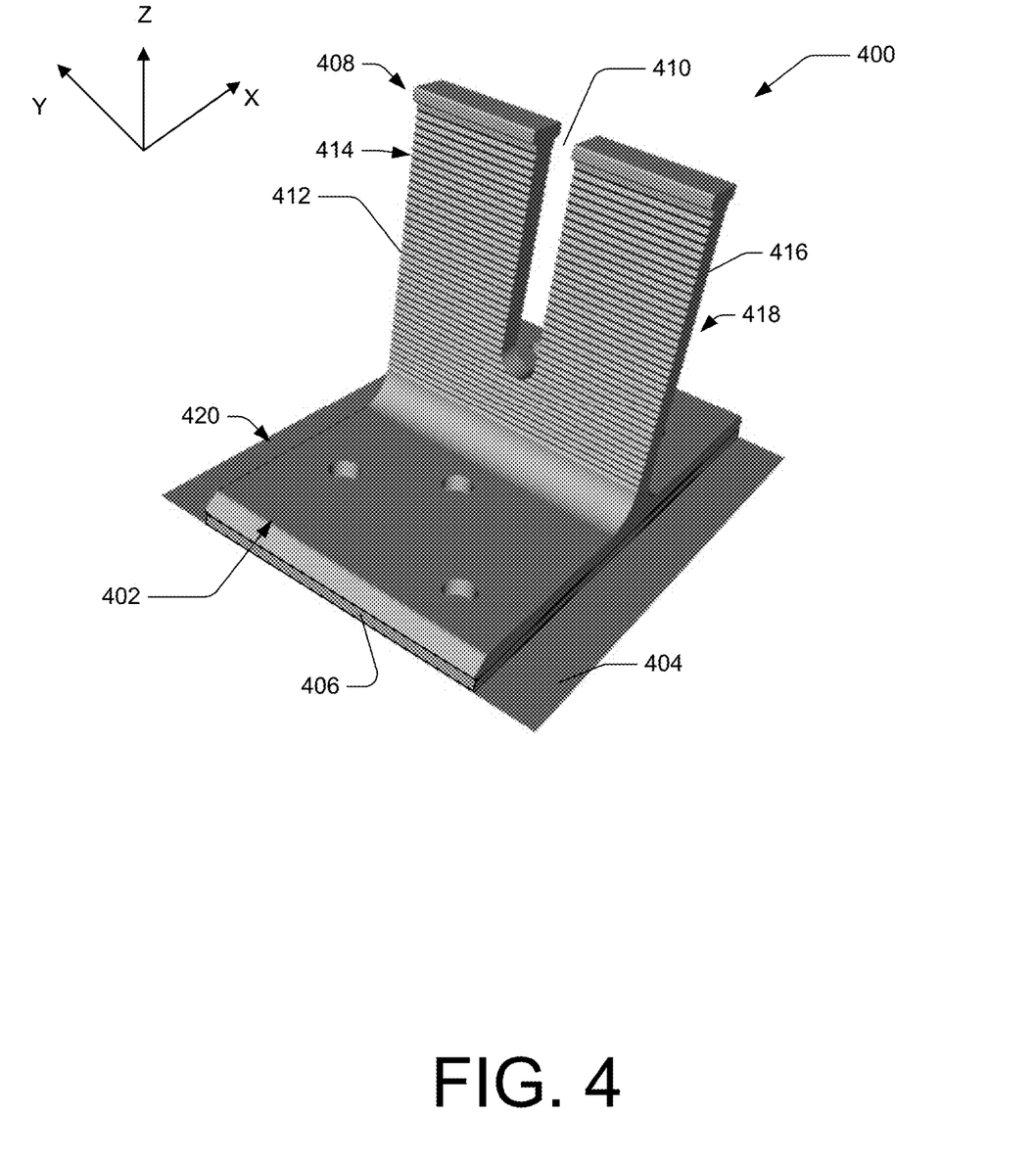
FIG. 4 illustrates a perspective view of an attachment bracket apparatus, according to an embodiment of this disclosure.

In FIG. 4, an attachment bracket apparatus 400 ("bracket") is shown. In an embodiment, the bracket 400 may be configured to be mounted directly to a support surface to support a solar panel mount rail by securing the solar panel mount rail thereto. The bracket 400 includes a base 402 that extends in a first plane (such as a horizontal plane or in the X direction). The base 402 of the bracket 400 is configured to be secured to a mounting structure 404 (like that of 104 in FIG. 1). In an embodiment, bracket 400 may include a flexible, waterproof sheet 406 that is placed against the bottom surface of the base 402 so as to provide a highly water-resistant engagement (i.e., if not waterproof, though a perfect waterproof result may not be guaranteed due to the expectation of puncture holes through the waterproof sheet 406 upon fasteners being inserted to secure the bracket 400 to a surface) with the mounting structure 404 and the base 402. For example, in an embodiment, sheet 406 may include or be formed entirely of a butyl material (e.g., or other material with similar properties as butyl). Additionally, in an embodiment, may include a thin, non-stick film (not shown) to protect the integrity of the waterproof material prior to actual installation, at which time the film is removed before placing the bracket 400 (with sheet 406) against the mounting structure 404. With the sheet 406, the bracket 100 may be secured to the mounting structure 404 via fasteners (like the fasteners 106 as in FIG. 1, but not shown in FIG. 4) that are inserted through the base 402 and into the mounting structure 404. Moreover, in some instances, various intervening components may be disposed between the bracket 400 and the mounting structure 404. For example, tar paper, shingles, housewrap, roof decking, sheathing, or other components of a roof or other structure may be disposed between the sheet 406 on the base 402 of the bracket 400 and the mounting structure 404.

The bracket 400 also includes a flange 408 extending vertically from a top side of the base 402 of the bracket 400, opposite the side with the sheet 406, in a direction transverse to a direction of extension of the plane of the base 402. In an embodiment, the flange 408 may extend, for example, in a second plane (such as a vertical plane or in the Z direction) that is substantially perpendicular to the first plane. In an embodiment, the flange 408 extends from a top side of the base 402 and is oriented such that a lateral width dimension (i.e., in the Y direction) of the flange 408 extends transverse to a longitudinal length dimension (i.e., in the X direction) of the base 402. In an embodiment, the orientation of the flange 408 is such that the intersection of the flange 408 with the base 402 delineates a symmetrical bisection of the base 402. The bisectional aspect may provide additional holding strength with respect to the integrity of the secure engagement between the bracket 408 and the mounting structure 404.

The flange 408 includes an aperture 410 extending therethrough in the thickness direction (i.e., the X direction). Further, the aperture 410 extends in a vertical direction of the flange 408 (i.e., the height, or the Z direction), for at least a portion of the total dimension from the top edge to where the flange 408 joins (e.g., is integral with) the base 402. In an embodiment, as shown in FIG. 4, the aperture 410 may begin at a first position more proximate to the joint area of the flange 408 and the base 402 and extend to a second position that is more distal from the joint area. More specifically, in an embodiment, the aperture may simply extend completely through the uppermost edge of the flange 408 (i.e., the flange 408 has a U-shape). For installation, the aperture 410 of the flange 408 is sized and shaped to receive one or more fasteners therethrough in order to secure a secondary structure (such as a solar panel mounting rail) to the flange 408 of the bracket 400.

In an embodiment, the flange 408 may include grooves 412 (e.g., sequentially repeated channels, extended teeth, etc.) extending between the aperture 410 and opposing lateral sides of the flange 408. The grooves 412 may be disposed on a first side 414 of the flange 108 and may be configured to correspond with ratchet teeth on one or more fasteners that are to be inserted into the aperture 410, during installation, in order to secure the secondary structure to the bracket 400. The flange 408 may also include grooves 416 extending from a second side 418 of the flange 408 that is opposite the first side 414. The grooves 412 and the grooves 416 may extend parallel to each other.

Figure 5:
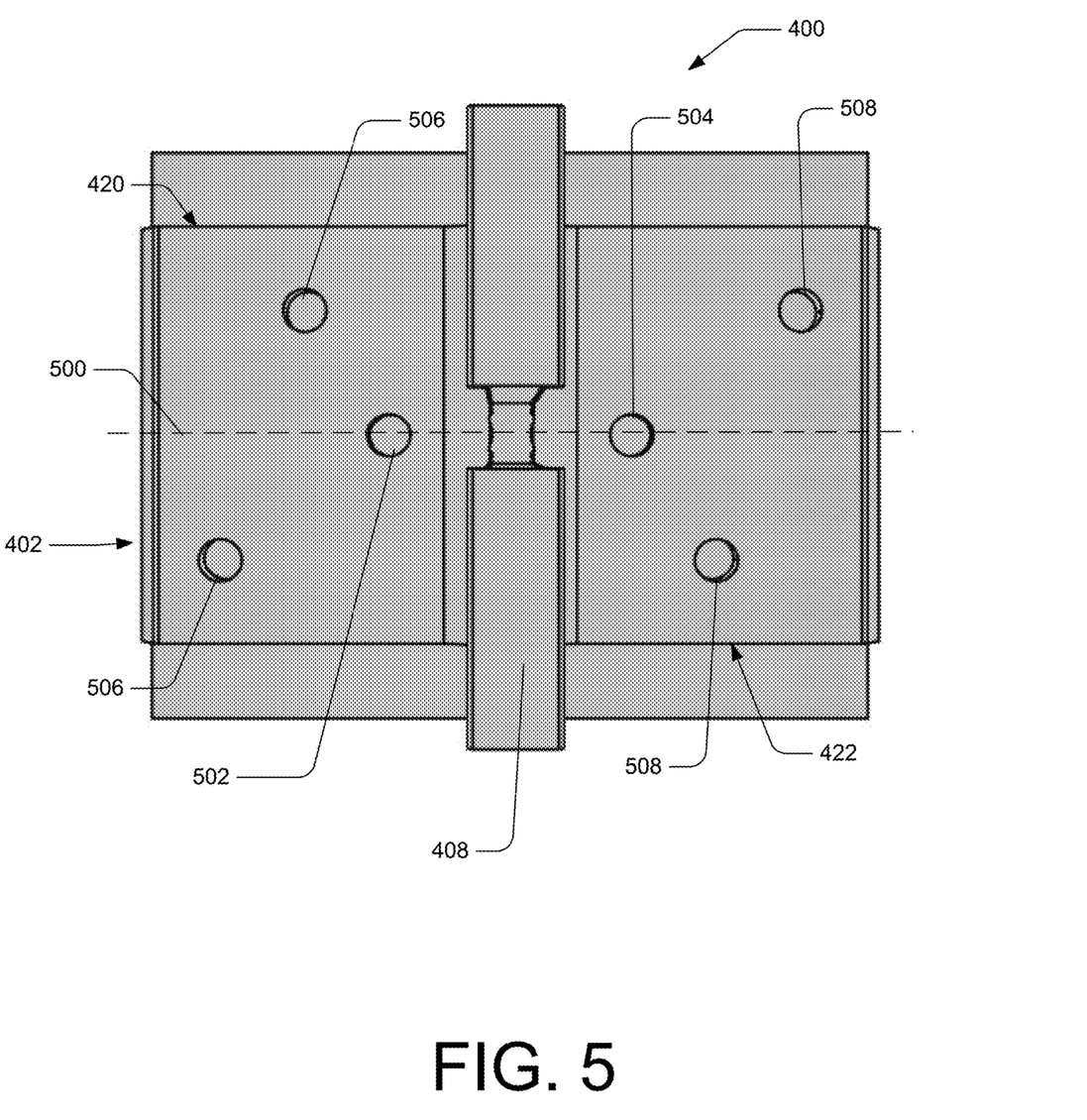
FIG. 5 illustrates a top view of the attachment bracket apparatus shown in FIG. 4, according to an embodiment of this disclosure.

As mentioned previously, the flange 408 may be positioned to delineate a bisection of the base 402, thereby delineating a first side 420 and a second side 422 of the base 402. As seen in FIG. 5, a central axis 500 extends along a lengthwise dimension (i.e., in the X-direction) of the base 402. In an embodiment, a first hole 502 may be formed in the first side 420 of the base 402, positioned along the central axis 500. The first hole 502 is shaped and sized to receive a fastener therethrough, whereby the bracket 400 may be secured to the mounting structure. The base 402 may also include a second hole 504 disposed along the central axis 500 and the second side 422 of the base 402. The second hole 504 is also shaped and sized to receive a fastener therethrough.

In an embodiment, the base 402 further includes one or more third holes 506 disposed on the first side 420 of the base 402 adjacent the central axis 500. Additionally, and/or alternatively, the base 402 may also include one or more fourth holes 508 disposed on the second side 422 of the base 402 adjacent the central axis 500. The one or more third holes 506 and/or the one or more fourth holes may include through holes that extend through the base 402 (i.e., the thickness direction, or Z direction of the base 402). Alternatively, in an embodiment, the one or more third holes 506 and/or the one or more fourth holes 508 may include semi-circular divots (not shown) formed in the base 402 and configured to provide a guide for self-drilling fasteners.

Notably, the one or more third holes 506 and/or the one or more fourth holes 508, respectively, are positioned offset from the central axis 500 (i.e., along the X direction) and further are offset from each other, respectively, in the direction that is perpendicular to the central axis 500 (i.e., along the Y direction). In an embodiment, no third hole 506 and/or no fourth hole 508 is positioned along the central axis 500 to avoid linear alignment with the respective first hole or second hole. In such an embodiment, the offset orientation of the one or more third holes 506 and/or the one or more fourth holes 508 may provide multiple benefits. In one example, the offset positions may provide an additional amount of attachment strength to the bracket 400 compared to a bracket having the fastener holes (the one or more third holes 506 and/or the one or more fourth holes 508) aligned in a single line (on each side). That is, when facing an upward force such as wind, the bracket 400 is stronger than other brackets due to the offset positions because the force acts upon the fasteners independently at the offset positions instead of uniformly when in a line, such as in other known brackets. Additionally, the offset positions may provide the ability to attach the bracket 400 more securely in a situation where the surface upon which it is mounted has a mounting structure that is not in uniform alignment with the structural features thereof. As such, the offset positions of the one or more third holes 506 and/or the one or more fourth holes may provide a greater chance of success to attach a fastener in the holes to such a surface than compared to other known brackets that use aligned positions for fastener holes.

Figure 6:
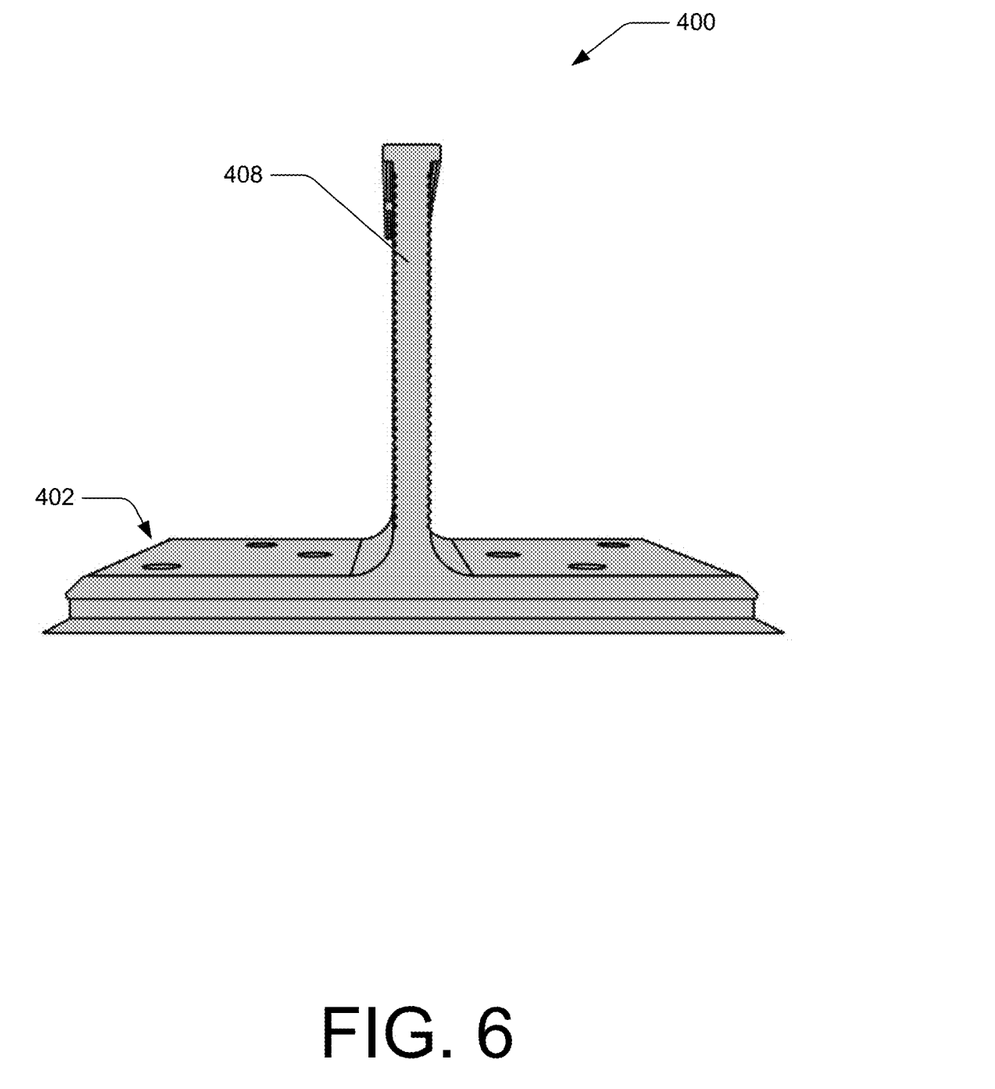
FIG. 6 illustrates a near side view (slightly looking downward from the vertical direction) of the attachment bracket apparatus shown in FIG. 4, according to an embodiment of this disclosure.

FIG. 6 provides an additional view of the bracket 400 for clarity of the features described above.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An attachment bracket apparatus for supporting photovoltaic modules attachable to a mounting structure, the attachment bracket apparatus comprising:
    a base having a surface that extends along a first plane;
    a waterproof sheet sized to be accommodated between the base and the mounting structure when the base is attached to the mounting structure; and
    a flange extending away from the base and along a second plane that is transverse to a length of the base and the first plane, the flange delineating a division between a first portion of the base and a second portion of the base,
    wherein the base includes:
        a central axis extending along the length of the base,
        a first hole located along the central axis and through the first portion of the base,
        a second hole located along the central axis and through the second portion of the base,
        one or more third holes located through the first portion of the base, and
        one or more fourth holes located through the second portion of the base,
        wherein the one or more third holes, respectively, are positioned offset from the central axis and are further offset from each other, respectively, in a direction that is perpendicular to a direction of extension of the central axis, and wherein a distance between the first hole and the second hole is less than a distance between a third hole of the one or more third holes and a fourth hole of the one or more fourth holes, wherein the flange includes one or more grooves on an outward facing surface of the flange, the grooves extending between opposing lateral sides of the flange.

2. The attachment bracket apparatus according to claim 1, wherein the waterproof sheet includes butyl.

3. The attachment bracket apparatus according to claim 1, wherein the first portion of the base is symmetrical with the second portion of the base about the flange.

4. The attachment bracket apparatus according to claim 1, wherein the flange has a slot therethrough.

5. The attachment bracket apparatus according to claim 1, wherein the flange has a slot that extends from a mid portion of the flange through an edge of the flange that is distal from the base.

6. The attachment bracket apparatus according to claim 1, wherein the first hole is positioned symmetrically opposite the second hole with respect to the flange.

7. An attachment bracket apparatus for supporting photovoltaic modules, the attachment bracket apparatus comprising:
    a waterproof sheet;
    a base attached to the waterproof sheet, the base extending along a first plane, and a length dimension of the base being longer than a width dimension of the base;
    a flange extending away from the base along a second plane that is oriented transverse to the first plane, the flange delineating a division between a first portion of the base and a second portion of the base, in the width dimension of the base;
    at least two holes extending through each of the first portion of the base and the second portion of the base, the at least two holes in the first portion of the base being offset from a central axis line through the base; and
    a first central hole located on the central axis on the first portion of the base, and a second central hole located on the central axis on the second portion of the base, symmetrically opposite the first central hole, such that a distance between the first central hole and the second central hole is less than a distance between a hole of the at least two holes on the first portion of the base and a hole of the at least two holes on the second portion of the base,
    wherein the at least two holes in the second portion of the base are offset from the central axis line,
    wherein the at least two holes in the first portion of the base are offset from each other in a direction that is perpendicular to the central axis, and
    wherein the at least two holes in the second portion of the base are offset from each other in the direction that is perpendicular to the central axis, wherein opposing outward facing surfaces of the flange include a plurality of grooves formed thereon.

8. The attachment bracket apparatus according to claim 7, wherein the waterproof sheet is sized to match a surface area of the base.

9. The attachment bracket apparatus according to claim 8, wherein the second central hole through the first portion of the base is positioned closer to the flange than the at least two first holes through the first portion of the base, and wherein the second central hole through the second portion of the base is positioned closer to the flange than the at least two first holes through the second portion of the base.

10. The attachment bracket apparatus according to claim 7, wherein the at least two holes in the first portion of the base are offset from each other in a direction of the length dimension of the base.

11. The attachment bracket apparatus according to claim 10, wherein the at least two holes in the second portion of the base are offset from each other in the direction of the length dimension of the base.

12. The attachment bracket apparatus according to claim 7, wherein the waterproof sheet includes butyl.

13. The attachment bracket apparatus according to claim 7, wherein the flange includes a slot that extends along at least a portion of a length of the flange.

\* \* \* \* \*